Aug. 17, 1954
T. O. MATHUES
2,686,853
INERTIA SWITCH
Filed Feb. 28, 1951
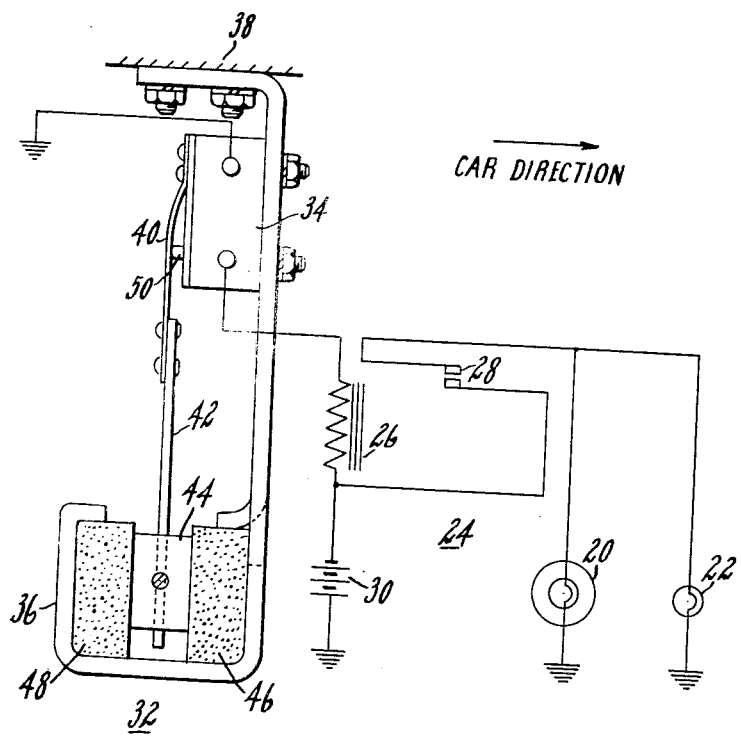
INVENTOR.
THOMAS O. MATHUES
BY
Willets, Hardman & Riley
HIS ATTORNEYS Patented Aug. 17, 1954

2,686,853

UNITED STATES PATENT OFFICE 2,686,853

INERTIA SWITCH

Thomas O. Mathues, Dayton, Ohio, assignor to General Motors Corporation, Detroit, Mich., a corporation of Delaware Application February 28, 1951, Serial No. 213,108

5 Claims. (Cl. 200—61.49)

1

This invention relates to an inertia switch and is particularly concerned with an inertia switch which has dampened movement which is adjustable to predetermined inertia load.

The main object of the invention is to provide an inertia switch, for use in connection with an automobile or other vehicle, which is operable upon predetermined rate of deceleration conditions to close a circuit for signal purposes and the like and which will break the said circuit immediately upon a reduction in the rate of deceleration.

In carrying out the above object, it is therefore another object of the present invention to provide an inertia switch operable in one direction only for controlling a circuit and operable upon predetermined rapid changes of acceleration or deceleration.

A still further object of the invention is to provide an inertia operated device including a snap action switch and a spring hung weighted pendulum for actuating the snap action switch, which pendulum is dampened against minor movements thereof and wherein the pendulum is only operable to actuate the switch under predetermined inertia conditions.

Further objects and advantages of the present invention will be apparent from the following description, reference being had to the accompanying drawing which shows an inertia switch of the type to be described hereinafter together with a circuit to be controlled thereby.

In vehicles, such as automobiles, it is desirable to include signal lights which indicate when the vehicle is to be stopped or slowed down. These lights are generally energized by a hydraulically operated switch connected in the hydraulic brake line or in some cases, they are mechanically actuated by movement of the brake pedal. Signal systems of this character merely indicate that the vehicle is being slowed down or brought to a stop.

When traveling at high rates of speed and following another vehicle, it is often difficult to determine the rate of deceleration of the preceding vehicle since the signal light indicating a slowing down or stop operates whenever the brake is manipulated. This is the cause of many accidents in high speed driving since the rear driver does not apply his brakes with sufficient force in many instances to bring his car to a stop before the preceding vehicle has been brought to a stop. This is occasioned by two factors, first, there is always a time lag due to the reflex action of the operator of the second vehicle plus the fact that the rate of deceleration is difficult to judge, and, in high speed driving particularly, distance is covered quickly, often more quickly than the driver realizes.

The present invention is directed to a switch for use in a secondary signal system which includes a large stop light on the back of the car as indicated at 20 in the drawing, which stop light 20 is in parallel with the tell-tale light 22 on the dash. Signal light 20 is connected in a circuit 24 which includes a relay 26 having contacts 28, which relay is connected to a battery 30, the other side of which is grounded as are the various signal lights. The relay 26 is actuated by an inertia switch device 32 which includes a snap action micro switch 34 in circuit with the relay and the ground. The switch 34 includes a protruding actuating pin 50. The switch 34 is carried by the upper end of a mounting frame 36 which is bolted to the dashboard of the car at 38. Fastened to the micro switch 34 is a leaf spring 40 in close proximity to pin 50 and carrying at its lower free end a rigid pendulum 42 that includes a weight 44 at the lower end thereof which is adjustable thereon. The weight 44 is firmly held between two dampening blocks 46 and 48, preferably of sponge rubber, which are cemented to the frame 36 and which hold the pendulum weight 44 therebetween.

During normal operation and stopping functions of the automobile, the rate of deceleration is insufficient to overcome the resistance of the dampening block 46 so that the pendulum 42 does not move sufficiently to press against the pin 50 of the micro switch 34. Thus the circuit remains open. When a fast stop is necessary, that is, one which entails a rapid rate of deceleration, the pendulum 42 is carried sufficiently toward the right against the resistance of the dampener 46 to bear against and move the pin 50 and cause the switch 34 to snap closed which energizes the relay coil 26 to close contacts 28, thereby establishing a circuit through signal light 20 and telltale light 22. Since the signal light 20 is an auxiliary light of large dimensions, preferably with the word "Danger" marked thereon, the cars following will immediately be aware that a fast stop is being made and they, in turn, can govern their actions accordingly. As soon as the emergency is over and the rate of deceleration lessens, the pendulum 42 is brought back to substantially normal position through the resiliency of the dampening block 46, causing switch 32 to open and deenergize the relay 24 whereby the signal lights 20 and 22 are also deenergized.

In this manner, it will be noted that the inertia switch is operable upon predetermined rates of deceleration which may be governed to a large degree by the adjustment of weight 44 on the pendulum 42. Lower rates of deceleration do not affect the pendulum sufficiently to close the circuit of relay 24 and similarly rapid acceleration which might cause the pendulum 42 to move to the left does not affect the switch 34 since the pendulum is moving away from pin 50. Similarly, dampening blocks 46 and 48 prevent chattering of the pendulum 42 on rough roads and the like, whereby the switch 34 remains in open position except under emergency conditions involving a rapid rate of deceleration.

Thus the absolute value of deceleration is important in the operation of the device, that is to say, a high rate of deceleration will actuate the device, thus indicating an emergency stop. It has been found that a quick change from 5 ft./sec.$^2$ to 10 ft./sec.$^2$ will cause the switch to operate, whereas a slowly approached rate of deceleration in the order of 10 ft./sec.$^2$ will not cause the switch to act.

It is apparent that the switch may be reversed in action, in other words, to indicate rapid acceleration if this condition is at any time desired. However, the basic use of the switch 32 is to energize circuits and lights indicating emergency stops whereby the vehicles following the stopping vehicle will be notified immediately that a fast stop is being made in differentiation to a normal stop as will be indicated by the usual stop lights on the vehicle. I am aware of various types of inertia switches, but in all cases, these switches lack the dampening means and the resistance of the dampening means to prevent actuation of the switch except under predetermined conditions of deceleration.

The use of the micro switch 34 as the switch member is desirable. Switches of this type are biased to a position and are snap acting. It is apparent that any snap action switch may be substituted, although it should preferably be biased to open position. Similarly, switches that are not snap acting may be substituted, although the action of the device is not as sure as with a snap action switch. Any of these variations come within the scope of this invention.

It is further apparent that in place of foam or sponge rubber dampeners, spring type or dashpot type dampeners may be used. However, I have found that foamed rubber, which includes foam from natural rubber or any of the synthetic rubbers, is the least expensive and is more desirable since it is easily attached to the frame 36 by cement and readily dampens the action of the weight 44 on pendulum 42 while providing sufficient resistance toward movement of the weight 44 to prevent the actuation of the switch 34 except under predetermined conditions. It will further be noted that the pendulum 42 being hung from the upper end of switch 34 through the leaf spring 40 is free to swing against the action of the dampeners 46 and 48 and this construction is more desirable than a pivot or other bearing type mounting wherein the actuation of the pendulum often varies due to weather conditions, lubrication at the pivot, etc.

While the embodiments of the present invention as herein disclosed, constitute preferred forms, it is to be understood that other forms might be adopted.

What is claimed is as follows:

1. An inertia switch adapted to be fixedly mounted to a portion of a vehicle and operable upon predetermined rate of deceleration of said vehicle, the combination comprising; a frame, a snap action switch mechanism normally biased to open position carried by one end of said frame, a spring hanger associated with the inertia switch and passing in operating relation to the snap action switch, a rigid pendulum depended from the lower end of said spring hanger and including a weight at the lower end thereof and a dampener consisting of sponge rubber acting on either side of the weight and held by the frame, said damper resisting free movement of said weight for selectively preventing actuating of the switch except under predetermined conditions of deceleration.

2. A switch as claimed in claim 1, wherein the weight is adjustable on the pendulum for selectively varying the action of the switch.

3. An inertia switch adapted to be fixedly mounted on a portion of a vehicle for energizing a signal circuit when the rate of deceleration exceeds a predetermined value, comprising in combination; a frame member, a pendulum swingably mounted at one end of said frame and freely movable in one plane; switch means associated with the side of said frame and adapted to be actuated by said pendulum upon a predetermined swinging movement thereof in one direction, and uniform, constant dampening means for controlling the swinging motion of said pendulum in both directions so that minor vibrations and movements do not effect the pendulum sufficiently to cause it to actuate said switch said dampening means consisting of blocks of spongy elastomeric material.

4. The switch as claimed in claim 3, wherein the switch is snap acting to circuit closing position and is normally biased to circuit opening position.

5. The switch as claimed in claim 3, wherein the pendulum includes a weight adjustably mounted thereon for selectively varying the action of the switch.

References Cited in the file of this patent

UNITED STATES PATENTS

| Number | Name | Date |
|---|---|---|
| 1,288,128 | Murray | Dec. 17, 1918 |
| 1,746,171 | Vatinet | Feb. 4, 1930 |
| 2,068,339 | Logan | Jan. 19, 1937 |

FOREIGN PATENTS

| Number | Country | Date |
|---|---|---|
| 88,399 | France | Aug. 27, 1951 |